United States Patent
Lincoln et al.

(10) Patent No.: US 8,130,849 B2
(45) Date of Patent: Mar. 6, 2012

(54) MAXIMUM A POSTERIORI INTERFERENCE ESTIMATION IN A WIRELESS COMMUNICATION SYSTEM

(75) Inventors: Bo Lincoln, Lund (SE); Matthias Kamuf, Lund (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 750 days.

(21) Appl. No.: 12/211,470

(22) Filed: Sep. 16, 2008

(65) Prior Publication Data

US 2010/0067627 A1 Mar. 18, 2010

(51) Int. Cl.
*H04K 1/10* (2006.01)
*H04L 27/28* (2006.01)

(52) U.S. Cl. .................. 375/260; 375/259; 327/100

(58) Field of Classification Search .............. 375/260
See application file for complete search history.

(56) References Cited

U.S. PATENT DOCUMENTS 7,349,379 B2   3/2008   Schmidl et al.
(Continued)

FOREIGN PATENT DOCUMENTS

EP   1901503 A2   3/2008
(Continued)

OTHER PUBLICATIONS

Casteñada et al., "On Downlink Intercell Interference in a Cellular System," IEEE 18th International Symposium on Personal, Indoor and Mobile Radio Communications—PIMRC 2007, Sep. 3-7, 2007, pp. 1-5.

(Continued)

*Primary Examiner* — David C. Payne
*Assistant Examiner* — Erin File
(74) *Attorney, Agent, or Firm* — Coats & Bennett, P.L.L.C.

(57) ABSTRACT

Methods and apparatus are disclosed for estimating inter-cell interference levels for resource elements of a received Orthogonal Frequency-Division Multiplexing (OFDM) signal. In an exemplary method in a wireless receiver, a reference symbol interference levels is measured for each of a plurality of reference symbols in a received OFDM signal, and interference scaling factors are mapped to each of a plurality of resource elements of the received OFDM signal. Each interference scaling factor reflects the probability that the corresponding resource element or group of resource elements is subject to interference from an interfering OFDM signal. Interference levels for each of the resource elements are then estimated as a function of the measured reference symbol interference levels and the interference scaling factors.

27 Claims, 6 Drawing Sheets

U.S. PATENT DOCUMENTS

| | | | |
|---|---|---|---|
| 7,366,259 B2 | 4/2008 | Yellin et al. | |
| 7,805,140 B2* | 9/2010 | Friday et al. | 455/436 |
| 2006/0013168 A1* | 1/2006 | Agrawal et al. | 370/335 |
| 2009/0059859 A1* | 3/2009 | Kuze et al. | 370/329 |
| 2009/0060063 A1* | 3/2009 | Guey | 375/260 |
| 2009/0274074 A1* | 11/2009 | Astely | 370/280 |
| 2010/0031107 A1* | 2/2010 | Bu et al. | 714/748 |
| 2010/0208854 A1* | 8/2010 | Guess et al. | 375/347 |
| 2010/0322198 A1* | 12/2010 | Friday et al. | 370/332 |
| 2011/0064173 A1* | 3/2011 | Ojard | 375/346 |

FOREIGN PATENT DOCUMENTS

| | | |
|---|---|---|
| KR | 2002-0046336 A | 6/2002 |
| WO | 2008/068669 A1 | 6/2008 |

OTHER PUBLICATIONS

Hsieh et al., "Channel Estimation for OFDM Systems based on Comb-Type Pilot Arrangement in Frequency Selective Fading Channels," IEEE Transactions on Consumer Electronics, Feb. 1998, pp. 217-225, vol. 44, No. 1.

Park et al., "Adaptive Inter-Cell Interference Management for Downlink FH-OFDMA Systems," 10th International Conference on Advanced Communication Technology—ICACT 2008, Feb. 17-20, 2008, pp. 1040-1044, vol. 2.

Plass et al., "Investigations on Link-Level Inter-cell Interference in OFDMA Systems," Symposium on Communications and Vehicular Technology, Nov. 23, 2006, pp. 49-52.

* cited by examiner

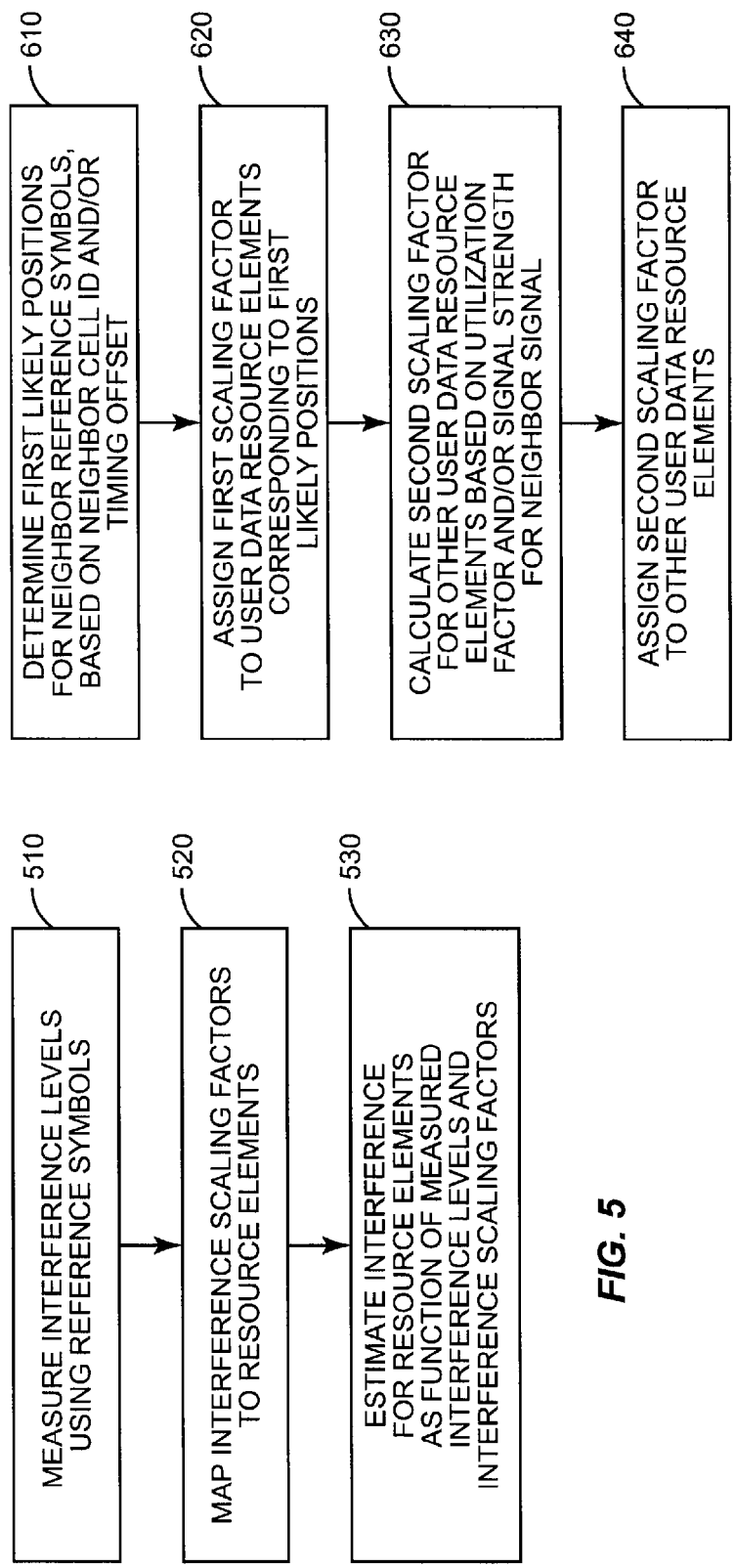

MAXIMUM A POSTERIORI INTERFERENCE ESTIMATION IN A WIRELESS COMMUNICATION SYSTEM

TECHNICAL FIELD

The present invention generally relates to wireless communication systems, and particularly relates to techniques for estimating inter-cell interference levels for resource elements of a received Orthogonal-Frequency Division Multiplexing (OFDM) signal.

BACKGROUND

Wireless communication systems using an advanced radio access technology known as Long-Term Evolution, or LTE, are currently under development by members of the 3rd-Generation Partnership Project (3GPP). For downlink transmission (base station to mobile terminal), 3GPP has specified the use of Orthogonal Frequency-Division Multiplexing (OFDM) technology. In OFDM systems such as LTE, the signal is structured so that multiple simultaneously transmitted symbols are generally orthogonal to one another. As is well known to those skilled in the art, this is primarily achieved in two ways. First, the multiple sub-carriers of the OFDM signal are constructed by the transmitter so that they are mutually orthogonal over an OFDM symbol interval. Second, a so-called cyclic prefix, having a duration that exceeds the expected delay spread of the transmission channel, is inserted at the beginning of each OFDM symbol. Upon demodulation, the cyclic prefix is discarded, thus avoiding or at least mitigating inter-symbol interference caused by time dispersion.

Each symbol of the LTE OFDM signal is an information symbol, carrying user data or control channel data, or a reference, or "pilot," symbol, and is modulated using QPSK, 16QAM, or 64QAM modulation schemes. Thus, upon reception, each symbol is demodulated to two, four, or six "soft" bits. Typically, the value of each soft bit corresponds to the log-likelihood ratio between the probability that the transmitted bit had a value of one and the probability that the originally transmitted bit had a value of zero. This likelihood is usually calculated using an estimated signal-to-noise ratio for this symbol.

All practical standards for data transmission also include a channel coding scheme to improve the reliability of the transmission of information bits. Generally speaking, such a scheme transforms N uncoded information bits into M encoded bits, where M>N. Although the details of various coding schemes vary, erroneous bits can often be corrected provided that the errors are relatively few, given the coding rate N/M and other code constraints. In most modern channel coding schemes, such as the turbo coding techniques specified by 3GPP for LTE, the decoder exploits the reliability information inherent in the soft bit values provided to it.

If the decoder is given correct information on which of the demodulated bits are more reliable than others, i.e., through the soft bit values, the decoding performance of a typical decoder is much better than if all bits are treated equally. Those skilled in the art will appreciate that different bits may have different levels of reliability, or "trustworthiness," for several reasons. For instance, some received information symbols may be subject to more fading than others; the corresponding demodulated bits are therefore less reliable. Other symbols may be more affected by interference than others, again resulting in less reliable demodulated bits.

In typical OFDM systems, including LTE systems, certain symbols in the time-frequency grid defined by the OFDM signal are designated as reference symbols. These reference symbols have a value that is known to the receiver and are used by the receiver as pilot symbols to characterize the propagation channel between the transmitter and the receiver and to estimate the noise and interference variance of the received signal. These channel estimates and noise-plus-interference estimates are used to calculate an estimated signal-to-interference ratio (SIR) for use in demodulating the information symbols.

One problem with this general approach is that the reference symbols are relatively sparse. In general, the propagation channel information yielded by the reference symbols is generally highly correlated with the propagation channel characteristics experienced by nearby information symbols in the time-frequency grid of the OFDM signal. Thus, channel estimates obtained from the reference symbols may be reliably used in demodulating and decoding neighboring symbols. However, the same may not be true with respect to interference, especially inter-cell interference caused by OFDM signals transmitted from neighboring base stations.

In a reuse-one system such as 3GPP LTE systems, interference from neighboring base stations can be heard by a mobile terminal in a large part of the serving cell. If the interfering downlink signal is less than fully utilized, some of the resource elements of the interfering OFDM symbol are empty, while others contain modulated data. Thus, the interference to the desired OFDM signal varies from one resource element to another. Because the reference symbols used by the wireless receiver to estimate interference power are sparse, this variation from one resource element to another is not measured.

As will be discussed in more detail below, the conventional assumption that all resource elements in the vicinity of a reference symbol are subject to the same levels of interference as the reference symbol can cause poor performance in the decoding of the data symbols carried by those resource elements. Accordingly, improved techniques in OFDM systems for estimating inter-cell interference from neighboring OFDM signals are needed.

SUMMARY

Methods and apparatus are disclosed for estimating inter-cell interference levels for resource elements of a received Orthogonal Frequency-Division Multiplexing (OFDM) signal. Although specifically applicable to wireless receivers in 3GPP LTE systems, the techniques disclosed may also be applied in other OFDM-based systems.

Various embodiments of the present invention exploit a priori knowledge characterizing the relationship between the structure of the desired OFDM signal and the structure of the interfering OFDM signal. In several embodiments, reference symbol interference levels for each reference symbol in the received OFDM signal are measured, and then mapped into individual estimates for other resource elements using this a priori knowledge. In other words, the interference level is estimated based on information in reference symbols of the received OFDM signal only, using conventional means, to obtain a reference-symbol interference variance, which may apply to several resource elements in a neighborhood. Then, the interference levels in resource elements containing user data may be estimated from the reference-symbol interference variance, using a function that defines an expected relationship between the reference-symbol interference variance and the interference at each user data resource element, based on a priori knowledge of the interfering signal characteristics.

In an exemplary method in a wireless receiver, a reference symbol interference level is measured for each of a plurality of reference symbols in a received OFDM signal, and interference scaling factors are mapped to each of a plurality of resource elements of the received OFDM signal. Each interference scaling factor reflects the probability that the corresponding resource element or group of resource elements is subject to interference from an interfering OFDM signal. Interference levels for each of the resource elements are then estimated as a function of the measured reference symbol interference levels and the interference scaling factors.

In some embodiments, the estimation of interference levels for the resource elements may comprise calculating a reference interference level for a region of proximately located resource elements based on measured reference symbol interference levels for two or more reference symbols within the region, and estimating the interference level for each information-carrying resource element within that region by scaling the reference interference level with the interference scaling factor for that resource element. In some embodiments, interference scaling factors for each resource element may be determined by assigning a first scaling factor value to resource elements having positions in the received OFDM signal that correspond to probable positions for reference symbols in the interfering OFDM signal and assigning one or more differing scaling factor values to remaining resource elements.

In some cases, one or more of the interference scaling factors may be calculated as a function of a utilization factor corresponding to the interfering OFDM signal; the utilization factor may be directly estimated by the wireless receiver, received from the serving base station, or assumed to be a given value. In still other embodiments, one or more of the interference scaling factors may be further based on one or more of a time offset between the received OFDM signal and the interfering OFDM signal, a cell identifier corresponding to the interfering OFDM signal, and an estimated signal strength for the interfering OFDM signal.

Wireless receivers according to the present invention are also disclosed, some embodiments of which include one or more processing circuits configured to carry out one or more of the methods described above on received OFDM signals. Of course, the present invention is not limited to the above methods, apparatus, features and advantages. Indeed, those skilled in the art will recognize additional features and advantages, as well as variations of the disclosed methods and apparatus that fall within the scope of the present invention, upon reading the following detailed description and viewing the accompanying drawings.

BRIEF DESCRIPTION OF THE DRAWINGS

FIGS. 5, 6, and 7 are process flow diagrams illustrating methods for estimating inter-cell interference in an OFDM system according to some embodiments of the invention.

DETAILED DESCRIPTION

Figure 1:
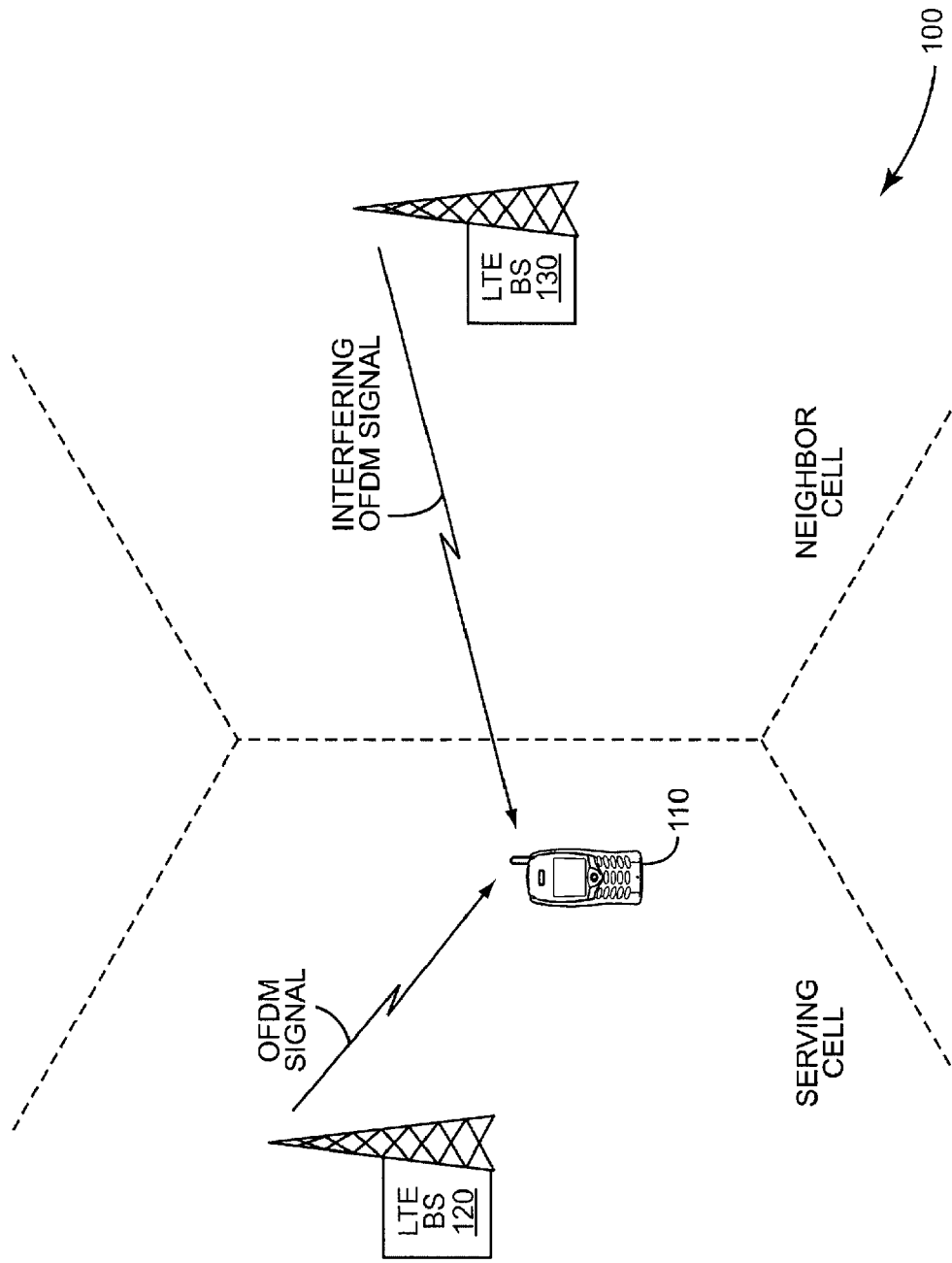
FIG. 1 illustrates a portion of an LTE wireless communication network.

FIG. 1 presents a simplified view of a portion of a 3GPP LTE network 100 according to some embodiments of the present invention, including a mobile terminal 110 receiving an OFDM signal from serving LTE base station 120. Because it is situated close to the border of the serving cell, mobile terminal 110 also "hears" an interfering OFDM signal transmitted by neighbor LTE base station 130. The level of the interference from neighboring cells will depend on the mobile terminal's location and the prevailing radio-frequency (RF) propagation conditions between mobile terminal 110 and the serving base station 210 and neighbor base station 130. Those skilled in the art will appreciate that inter-cell interference may be caused by more than one base station, depending again on the mobile terminal's location and the RF channel conditions.

The details of the present invention are generally described herein with reference to exemplary embodiments in an LTE communication system. However, those skilled in the art will appreciate that the inventive techniques described herein are not limited to such systems, and may be applied more generally to OFDM-based systems where inter-cell interference levels must be estimated for resource elements. Those skilled in the art will appreciate that the term "resource element" as used herein in connection with LTE systems, refers to the smallest element in the time-frequency grid of the LTE signal, e.g., a single symbol modulating a particular sub-carrier at a particular symbol interval. Each of these resource elements may carry user data, control channel data, or a reference symbol, or may be unoccupied in a less than fully loaded OFDM signal.

As was discussed above, LTE OFDM signals include reference symbols at pre-determined positions in the time-frequency grid of resource elements defined by the downlink signal. These reference symbols have known values and are used by the wireless receiver in the mobile terminal as pilot symbols for estimating the downlink propagation channel and to estimate the noise and interference variance of the received signal. These channel estimates and noise-plus-interference estimates are used by the receiver to calculate an estimated signal-to-interference ratio (SIR) for use in demodulating information symbols, which may include, for instance, symbols carrying user data or control channel data.

A typical procedure for estimating the variance of the noise-and-interference on a per-resource element basis includes two main steps. First, the instantaneous noise and interference level $\hat{e}_{k,l}$ at the reference symbol positions of the received OFDM signal is calculated by subtracting re-generated reference symbols from the corresponding actual received symbol data in the reference symbol position:

$$\hat{e}_{k,l} = y_{k,l} - \hat{h}_{k,l} r_{k,l}, (k,l) \in K^{RS}, \quad (1)$$

where k references the OFDM sub-carrier, i.e., the position in the frequency direction of the OFDM symbol grid, while l indexes the OFDM symbol position, i.e., the position in the time direction of the OFDM grid. $K^{RS}$ is the set of reference symbol positions, $y_{k,l}$ is the received symbol data in position k,l, $\hat{h}_{k,l}$ is the channel estimate (which is obtained using conventional means), and $r_{k,l}$ is the a priori known reference symbol value for the reference symbol at position k,l.

Next, the interference variance for each of the resource elements in the OFDM symbol grid is estimated by averaging the measured instantaneous noise and interference powers over a pre-defined region of reference symbol positions:

$$\hat{\sigma}_{k,l}^{2,RS} = g_{k,l} \sum_{(k,l) \in K_{k,l}^{\sigma}} \hat{e}_{k,l}^* \hat{e}_{k,l}, \qquad (2)$$

where $K_{k,l}^{\sigma} \subset K^{RS}$ is a subset of the reference symbol positions, typically selected to fall in a "neighborhood" that includes position k,l, while $g_{k,l}$ is a gain factor that depends on the size of $K_{k,l}^{\sigma}$ and the properties of the channel estimates. The set of reference symbols $K_{k,l}^{\sigma}$ used to estimate the interference variance is often the same for several resource elements, and may be the same for an entire LTE resource block or more. (An LTE resource block is a block of resource elements covering 12 contiguous sub-carriers and either 12 or 14 consecutive symbols, depending on whether the system is operating with extended cyclic prefixes.)

As noted above, a problem with this approach to interference estimation is that in some cases it only correctly estimates the interference in the reference symbol positions themselves. Any variation in interference levels between the reference symbols and the surrounding resource elements is not captured. Accordingly, conventional interference estimation techniques assign the same interference level to all resource elements in a certain neighborhood, where the term "neighborhood" is used herein to connote a region of resource elements, of a pre-determined size, surrounding a particular resource element. This means that for soft bit generation, from an interference point of view, all the soft bits demodulated from information-carrying symbols in the same neighborhood are considered equally reliable.

In a 3GPP LTE system, however, this assumption of equal trustworthiness is often not valid. Interference from one or more neighboring base stations can often be heard by mobile stations in a large part of the serving cell. Even when the downlink signals from the neighboring base stations are mostly empty, reference symbols and control channel data are still transmitted, creating strong interference in some resource elements of the desired OFDM signal, but none in others. For example, if an interfering OFDM signal is completely unloaded, interference will only appear in those resource elements of the desired OFDM signal that coincide in time and frequency with the reference symbols and control channel symbols of the interfering OFDM signal. Treating bits strongly affected by interference as having the same reliability as bits with virtually no interference can have a significant effect on the performance of a receiver's decoder. Especially for high coding rates, where the number of encoded bits is only slightly larger than the number of original bits, treating all bits as equally trustworthy even when some are clearly more affected by interference can lead to very bad performance.

Various embodiments of the present invention address this problem by exploiting a priori knowledge of the relationship between the desired OFDM signal and the structure of the interfering OFDM signal. Reference symbol interference levels for each reference symbol in the received OFDM signal are measured, and then mapped into individual estimates for each information-carrying resource element using this a priori knowledge. In other words, the interference level is estimated based on information in reference symbols of the received OFDM signal only, using conventional means, to obtain a reference-symbol interference variance $\hat{\sigma}_{k,l}^{2,RS}$. This reference-symbol interference variance $\hat{\sigma}_{k,l}^{2,RS}$ may apply to several resource elements in a neighborhood. Then, the interference levels in resource elements containing user data or control channel information may be estimated from the reference-symbol interference variance $\hat{\sigma}_{k,l}^{2,RS}$ according to:

$$\hat{\sigma}_{k,l}^2 = f_{k,l}(\hat{\sigma}_{k,l}^{2,RS}), \qquad (3)$$

where the function $f_{k,l}(x)$ defines an expected relationship between the reference-symbol interference variance and the interference at resource element k,l, based on a priori knowledge of the interfering signal characteristics.

The function $f_{k,l}(\hat{\sigma}_{k,l}^{2,RS})$ can in some embodiments be a simple gain factor $c_{k,l}$ that varies for different resource element positions k,l within a resource block or subframe:

$$f_{k,l}(\hat{\sigma}_{k,l}^{2,RS}) = c_{k,l}\hat{\sigma}_{k,l}^{2,RS}. \qquad (4)$$

In other embodiments, $f_{k,l}(\hat{\sigma}_{k,l}^{2,RS})$ can be a more complicated function of the resource element position, a utilization factor for the interfering signal, a time offset between the received OFDM signal and the interfering signal, and/or the signal strength of the interfering signal, as will be described more fully below.

Figure 2:
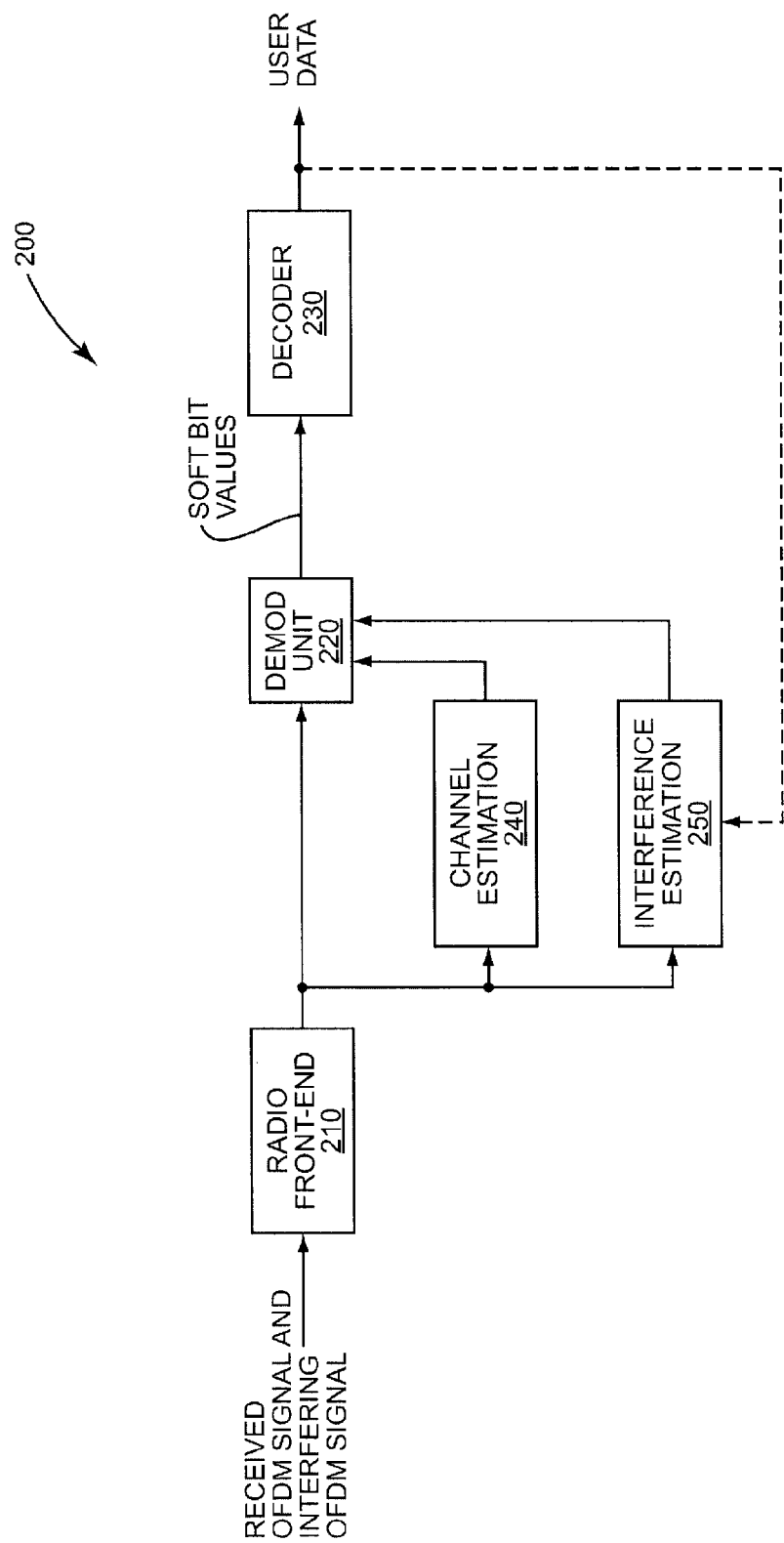
FIG. 2 is a block diagram illustrating functional elements of an exemplary wireless receiver according to some embodiments of the present invention.

FIG. 2 is a block diagram illustrating functional elements of a wireless receiver 200 configured to estimate inter-cell interference levels according to one or more embodiments of the invention. Those skilled in the art will appreciate that FIG. 2 presents a simplified view of a receiver circuit such as might be included in the mobile terminal 110 of FIG. 1. Details unnecessary to an understanding of the invention are omitted. Those skilled in the art will further appreciate that the receiver circuit 200 of FIG. 2 will in most cases be combined with a corresponding transmitter, and may be integrated into any of a consumer handset or personal digital assistant (PDA), wireless data card for use with a personal computer, wireless module for use in telematics or telemetry applications, or the like.

In any case, wireless receiver 200 includes a radio front-end circuit 210, which down-converts a received OFDM signal and converts it into digital form, using conventional means. Radio front-end circuit 210 thus typically includes at least a radio-frequency filter to remove unwanted frequencies and to isolate the remaining receiver circuitry from signals produced by a co-located wireless transmitter, a low-noise amplifier, a mixer circuit for down-converting the received radio-frequency signal to baseband frequencies, and a local oscillator circuit for driving the mixer. Radio front-end circuit 210 also includes an analog-to-digital converter (ADC) to convert the analog baseband signal to digital form, as well as circuitry for synchronizing the receiver circuit to the received signal and removing the cyclic prefix. Finally, radio front-end circuit 210 includes a discrete Fourier transform processor, typically implementing a Fast Fourier Transform (FFT), for converting the OFDM signal, which may comprise hundreds of orthogonal sub-carriers, into complex-valued information symbols, each of which corresponds to a resource unit of the OFDM signal. These and further details of an OFDM receiver front-end are well known to those skilled in the art; the simplified description provided here is presented only to provide context for the interference estimation techniques discussed in detail below.

Wireless receiver 200 also includes a demodulation unit 220 and a decoder 230. Generally speaking, demodulation unit 220 maps the complex-valued information symbols output by the radio-front end into multiple bits. In some embodiments, demodulation unit 220 uses estimates of the propagation channel provided by channel estimation unit 240 to compensate the complex-valued information symbols for amplitude and phase variation caused by the transmission channel, and "de-maps" the compensated information symbols into two, four, or six soft bit values (for LTE systems), depending on the modulation scheme employed. Demodulation unit 220 may also use the channel estimates provided by channel estimation unit 240, along with resource element-specific estimates of the noise and interference provided by interference estimation unit 250, to estimate a signal-to-interference ratio (SIR) for each resource element or for groups of proximately located resource elements. This estimated SIR may in turn be used to establish a reliability metric for each of the soft bits; as discussed above this reliability metric may comprise a bit log-likelihood ratio (LLR). Various methods for determining a bit-specific reliability metric based on estimated SIR or interference power estimates for the demodulated symbol are known to those skilled in the art; these methods include, for example, determining a symbol-specific LLR and converting the symbol-specific LLR into bit-specific LLRs. The details of these methods, however, are not important to an understanding of the present invention.

However determined, the soft bit values, including the associated reliability metrics, are supplied to decoder 230. Decoder 230 reverses the channel encoding performed by the downlink transmitter, using well known techniques. The 3GPP specifications for LTE currently specify the use of Turbo encoding for downlink, with a code rate of one-third; however, other coding schemes and/or coding rates are possible.

As is well known to those skilled in the art, the performance of a channel decoder is improved if the decoder is provided with accurate reliability information for each of the soft bits supplied to the decoder. The accuracy of the reliability information is determined by the accuracy of the channel estimates used by the demodulator as well as by the accuracy of the interference estimates. Reference symbols provided in the received OFDM signal may be used by channel estimation unit 240 to produce, using conventional techniques, channel estimates that are generally accurate for resource elements that are near the reference symbols on the time-frequency grid of the OFDM signal.

On the other hand, even if interference is accurately measured for a reference symbol, this measured interference may or may not provide an accurate estimate of the interference in nearby resource elements, depending on the structure and utilization of the interfering symbol. Accordingly, interference estimation unit 250 is configured, according to several embodiments of the present invention, to estimate interference levels for resource elements of the received OFDM signal as a function of measured reference symbol interference levels, obtained in a conventional fashion, and interference scaling factors that relate the reference symbol interference to other resource elements according to a priori information regarding the interfering signal's structure, timing, utilization, and/or signal level. Using this approach, soft bits from a given neighborhood are not automatically assigned identical reliability metrics. The result, as will be demonstrated below, is improved decoder performance.

Generally speaking, interference estimation unit 250 first determines a reference interference level for a region of proximately located resource elements, based on measured reference symbol interference levels for one or more reference symbols within the region. One such process was described above, in connection with Equation (2), and results in a reference symbol interference level $\hat{\sigma}_{k,l}^{2,RS}$ that is applicable to several resource elements in a "neighborhood," which may comprise all or part of a single resource block, portions of two or more contiguous resource blocks, or several entire resource blocks. Accordingly, to cover the entire time-frequency grid of the OFDM signal, several reference symbol interference level values may be calculated, each applicable to a particular neighborhood.

Interference estimation unit 250 then "maps" the reference interference level for a given resource element, $\hat{\sigma}_{k,l}^{2,RS}$, to an element-specific interference level, using a mapping function $f_{k,l}(\hat{\sigma}_{k,l}^{2,RS})$, as was discussed above in connection with Equation (3). In some embodiments of the invention, as will be discussed in more detail below, the mapping function may simply comprise an array of scaling values that are multiplied with the corresponding reference interference level to obtain a resource element-specific interference level estimate, as was shown in Equation (4) above. These scaling values may be mapped to the resource elements based on a priori knowledge of the interfering signal structure, for example, or based on past element-specific interference estimates obtained by comparing reconstructed information symbols to received symbol data. In other embodiments, the elements of the mapping function may be calculated using a function that takes into account one or more of the utilization of the interfering signal, a time offset between the received OFDM signal and the interfering signal, signal strength of the interfering signal, and the like.

As suggested above, the elements of the mapping function $f_{k,l}(\hat{\sigma}_{k,l}^{2,RS})$ may be determined in several different ways. One approach, which might be termed the "measurement-aided interference approach," utilizes a priori information about the structure and/or other characteristics of the interfering signal. Those skilled in the art will appreciate that the relationship between $\hat{\sigma}_{k,l}^{2,data}$ and $\hat{\sigma}_{k,l}^{2,RS}$ can be estimated by observing that some resource elements have a higher probability than others of being subjected to interference from a neighboring OFDM signal, particularly if the neighboring OFDM signal is lightly loaded, i.e., if the neighboring cell is less than fully utilized. Thus, for example, those information-carrying resource elements of the received OFDM signal that correspond to probable positions for neighboring cell pilot symbols are more likely to receive interference than resource elements that correspond to empty resource elements of the neighboring signal. Similarly, some resource elements have a higher probability than others of receiving interference due to control channels, broadcast channels, or synchronization channels of the neighboring cell.

Figure 3:
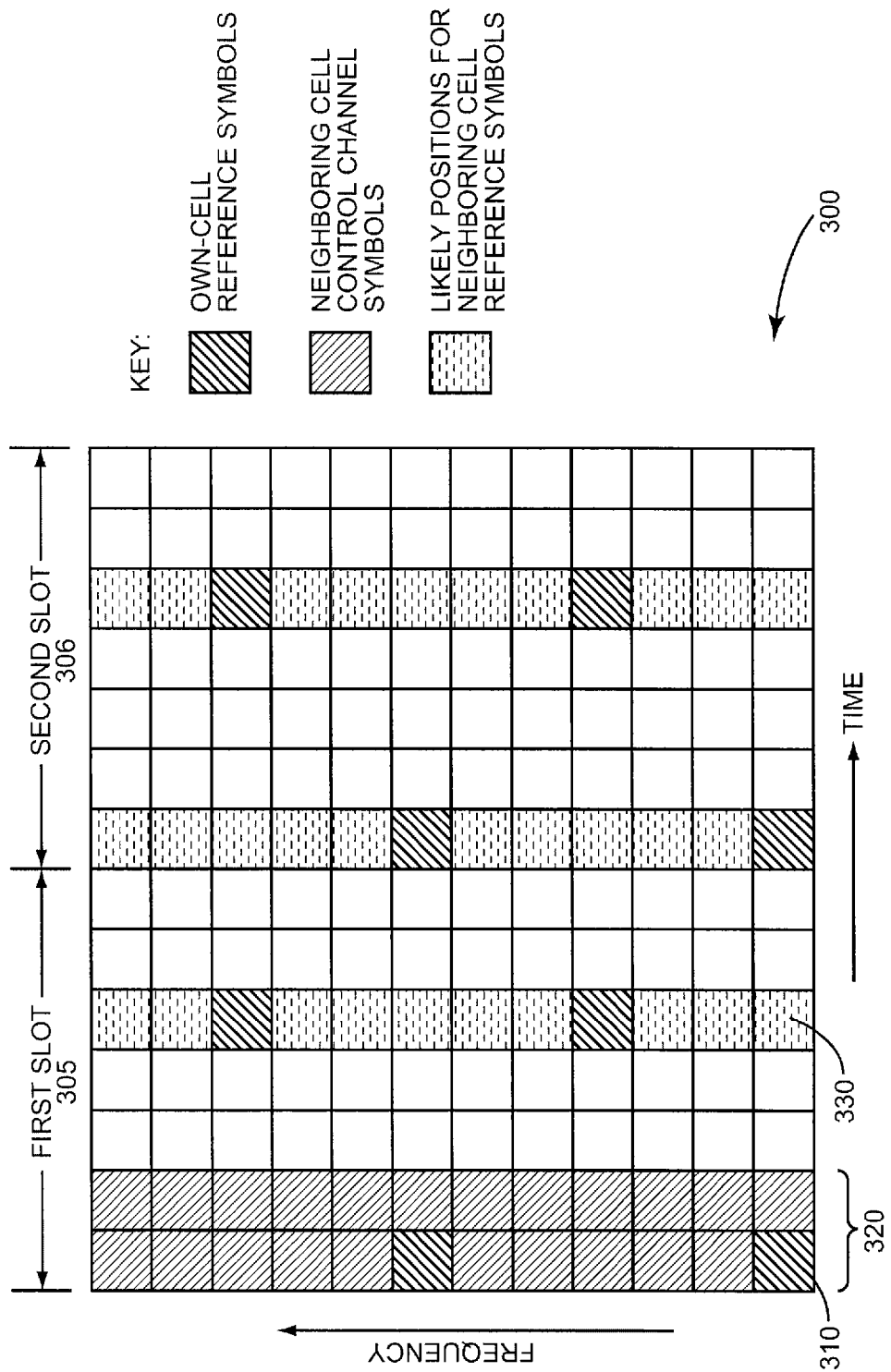
FIG. 3 illustrates the relationship between a frame of a received OFDM signal and interference from a neighboring OFDM signal.

This varying susceptibility to interference from a neighboring OFDM signal is illustrated in FIG. 3, which pictures one subframe 300 of a received OFDM signal, comprising a first slot 305 and second slot 306. Each slot comprises seven OFDM symbols in the pictured sub-frame; those skilled in the art will be aware that OFDM signals utilizing extended cyclic prefixes (to overcome exceptionally long channel delay spreads) may have six OFDM symbols per slot, instead. Own-cell reference symbols 310, which may be used to measure instantaneous reference symbol interference levels, are scattered throughout subframe 300, with two appearing in each of the first and fifth OFDM symbols of the first and second slots 305 and 306.

In LTE systems, control channel symbols and reference symbols are transmitted in every subframe, regardless of whether or not there is user data to be transmitted. Resource elements that are not allocated to control channels, reference symbols, or user data are empty, and thus include no signal energy. As a result, if an interfering LTE signal is lightly utilized, the interference to the desired signal may vary dramatically from one resource element to another.

Accordingly, interference measured at one reference symbol 310 might reflect interference from an occupied resource element of the interfering signal, while interference measured at a second reference symbol 310 might not, if the second reference symbol 310 coincides with an unoccupied resource element of the interfering signal. This can be seen in FIG. 3 by observing that the reference symbols 310 in the first OFDM symbol of subframe 300 are certain to coincide with control channel symbols for the interfering signal, assuming that the signals are synchronized. The remaining reference symbols 310, however, may or may not coincide with an occupied resource element in the interfering symbol, however, since the placement of reference symbols by sub-carrier frequency may vary from one LTE signal to the next. Thus, several resource elements 330, appearing in the fifth, eighth, and twelfth OFDM symbols of subframe 300, are likely (but not certain) positions for reference symbols transmitted by a neighboring cell. Those resource elements 330 that do not correspond to neighboring cell reference symbols might nonetheless correspond to resource elements of the interfering signal that are carrying user data, but the probability that each of the resource elements 330 is subject to interference from the neighboring signal is generally less than one.

The remaining resource elements in subframe 300 may or may not be subject to inter-cell interference, depending upon the instantaneous utilization of the neighboring cell. Generally speaking, the likelihood that one of these resource elements is occupied in the neighboring signal is less than one, and can be zero if the neighboring cell is completely unutilized in a given subframe.

Viewing FIG. 3, it is apparent that interference levels measured for reference symbols 310 in the first OFDM symbol of the subframe, which are subject to interference from the neighboring control channels, may be completely inapplicable to resource elements corresponding to unoccupied resource elements in the neighboring signal. Thus, if measured reference symbol interference levels are applied evenly to all resource elements in a given neighborhood, the resulting reliability metrics supplied to the decoder will provide little actual information as to the relative reliability between various soft bits. The result can be poor receiver performance.

Figure 4:
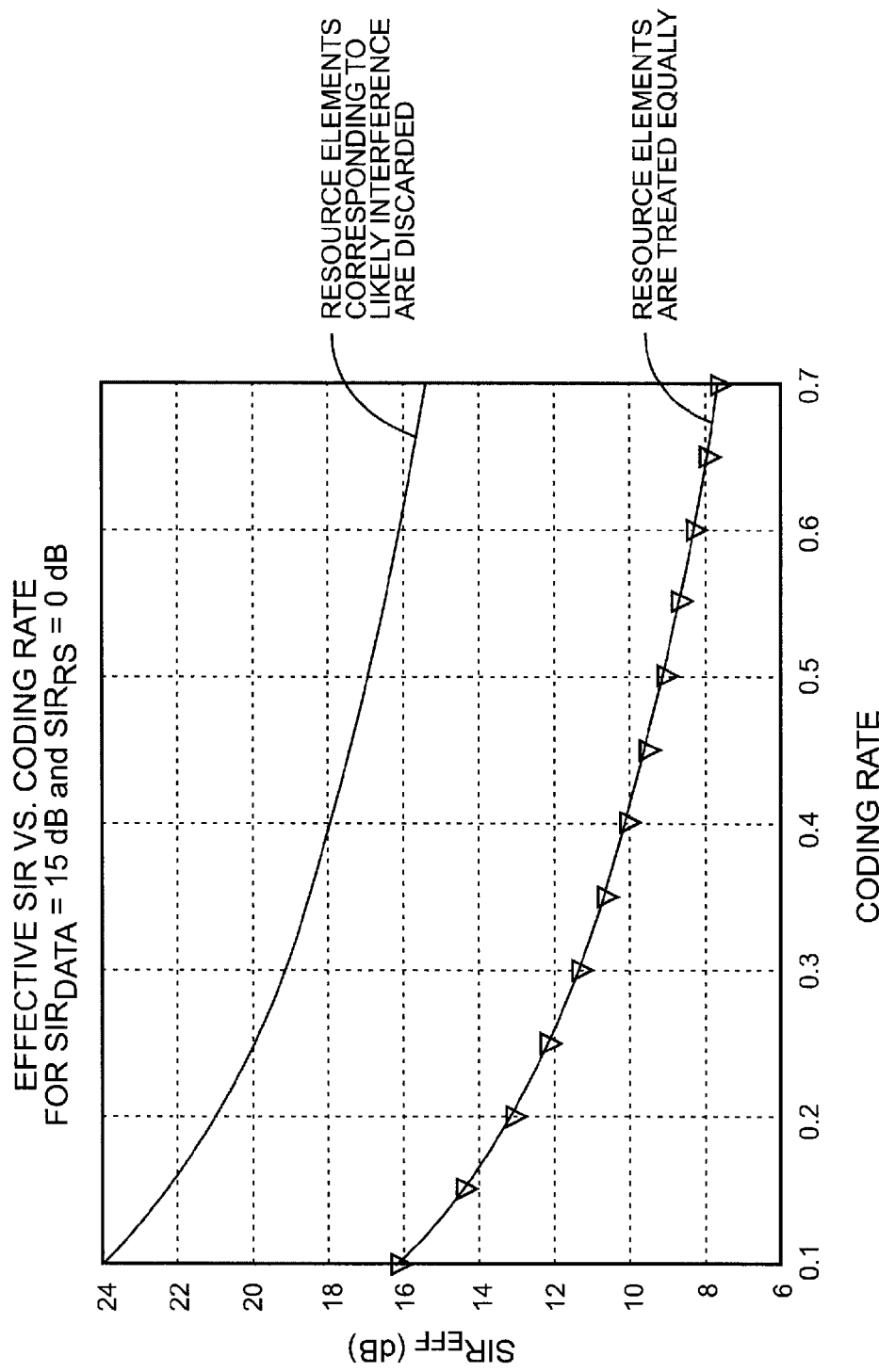
FIG. 4 is a graph comparing the effective signal-to-interference ratio performance of a prior-art receiver to an embodiment of the present invention, for a given signal environment and a range of channel coding rates.

This can be seen in FIG. 4, which plots the effective signal-to-interference ratio (SIR) for two approaches to a simple interference scenario. A 3GPP LTE system is assumed, in which the receiver is in a cell where interfering OFDM signals from neighboring cells are mostly empty. All cells are synchronized in time. For simplicity, it is assumed that the interfering signals are very strong, so that the SIR in any resource element of the received OFDM signal that corresponds to an occupied resource element in an interfering signal is 0 dB. Those resource elements corresponding to empty elements of the interfering signals are assumed to have an SIR of 15 dB. It is further assumed that the first two OFDM symbols in time are used for control channels (as in FIG. 3), and that there are thus 138 resource elements of the received OFDM signal dedicated to data (12 subcarriers times 12 OFDM symbols, less six reference symbols). Of these, 30 resource elements are likely to be strongly affected by reference symbol interference from other cells, as shown in FIG. 3.

If the coding rate is defined as r=N/M, where N is the number of input bits per M encoded bits, then the effect of the channel coding may be approximated in terms of an effective SIR after decoding:

$$SIR_{EFF} = SIR/r. \quad (5)$$

Given the example scenario described above, the effective SIR may be calculated for two processing approaches, versus a range of coding rates. In the first approach all 138 resource elements are treated equally—i.e., it is assumed that each user data resource element is subject to the same level of interference. The effective SIR for this scenario can be computed according to:

$$SIR_{EFF} = \frac{1/r}{\left[\frac{1}{SIR_{EMPTY}}\left(\frac{RE_{TOTAL}-RE_{INT}}{RE_{TOTAL}}\right) + \frac{1}{SIR_{INT}}\left(\frac{RE_{INT}}{RE_{TOTAL}}\right)\right]}, \quad (6)$$

where $SIR_{EMPTY}$=15 dB is the SIR for resource elements corresponding to empty resource elements in the interfering signal; $SIR_{INT}$=0 dB is the SIR for resource elements corresponding to interfering resource elements of the interfering signal; $RE_{TOTAL}$=138 is the total number of user data elements; and $RE_{INT}$=30 is the number of user data resource elements subject to interference from neighbor cells.

As seen from the lower curve in FIG. 4, the average effective SIR will be less than 15 dB for most coding rates, since the interference in some resource elements is actually quite large compared to others. This approach corresponds to conventional techniques in which reference symbol interference levels are used to directly estimate neighboring resource element interference.

In the second approach, which corresponds to a simple embodiment of the present invention, the 30 user data resource elements corresponding to likely interference are treated as pure noise and simply dropped, leaving only 108 user data resource elements. This will change the effective coding rate, since a number of received bits are thrown away; the effective coding rate for this "discard" scenario can be calculated according to:

$$r_{EFF} = \frac{r * RE_{TOTAL}}{RE_{TOTAL} - RE_{INT}}, \quad (7)$$

where r is the nominal channel coding rate and $r_{EFF}$ is the effective coding rate. In this example, $RE_{TOTAL}$=138 and $RE_{INT}$=30, so:

$$r_{EFF} \approx 1.28r. \quad (8)$$

If the 30 resource elements subject to interference are simply discarded, then the effective SIR can be shown to be simply:

$$SIR_{effective} = SIR_{EMPTY}/r_{EFF}. \quad (9)$$

The upper curve in FIG. 4 shows the effective SIR versus coding rate for the second approach, in which the 30 resource elements subject to interference are simply discarded. As can be seen, the relative gain is substantial (about 7.8 dB) for this simple embodiment. Those skilled in the art will thus appreciate that significant performance improvements are available in less extreme signal conditions, especially if more refined interference estimation approaches are employed, as enabled by various embodiments of the present invention.

Although the previous example was based on a number of assumptions, a number of information elements can be used to indirectly estimate the relationship between the desired OFDM signal and one or more interfering signals. These information elements can include, but are not limited to: neighboring cell time alignment relative to the desired signal, which may be used to estimate a time offset between the desired signal and an interfering signal from the neighbor cell; neighboring cell ID, which may be used to determine the likely position for neighbor cell reference symbols; neighbor cell signal strength; and neighbor cell utilization factor, which may be used to determine the probability that a given information-carrying resource element in the interfering signal is occupied. Those skilled in the art will appreciate that any of these information elements may be obtained at a wireless receiver via signaling from the serving base station. In some cases, one or more of these information elements may be measured or estimated directly by the wireless receiver.

Given one or more of these information elements, or given an assumption that an interfering signal is generally synchronized with the signal of interest, a probability of interference can be estimated for each individual resource element of the received OFDM signal. FIG. 5 thus illustrates an exemplary method for estimating resource element interference levels based on these estimated probabilities.

At block 510, instantaneous interference levels are measured at one or more reference symbols, using conventional techniques as discussed above. At block 520, interference scaling factors are mapped to each of several resource elements or groups of resource elements of the received OFDM signal. These interference scaling factors (which may be viewed as elements of the mapping function $f_{k,l}(\hat{\sigma}_{k,l}^{2,RS})$) discussed earlier) reflect a probability that the corresponding resource element or group of resource elements is subject to interference from one or more interfering OFDM signals. These probabilities may be derived based on whatever a priori information is available. For instance, if it is known (or assumed) that the interfering signal is time aligned to the desired signal and that the interfering signal is lightly loaded, than the probability that resource elements in the fifth, eight, and twelfth OFDM signals are subject to interference is higher than for resource elements in other positions. If a cell ID is known for a neighboring cell, then the probability of interference from a neighboring reference symbol can be even more accurately defined. Time offset information, if available, may be used to refine the interference scaling factors, by properly aligning the likely sources of interference with the resource elements of the desired OFDM signal.

As shown at block 530, interference levels for each of the resource elements are estimated as a function the measured reference symbol interference levels and the interference scaling factors. In some embodiments, the instantaneous interference levels for two or more reference symbols may be combined (e.g., averaged), as discussed above in connection with Equation (2), to determine a reference interference level for a neighborhood. This neighborhood may consist of all or a part of one or more resource blocks. In these embodiments, this reference interference level is scaled by the resource element-specific interference scaling factors determined above, to obtain element-specific interference level estimates. These element-specific interference level estimates may be used to estimate symbol-level or bit-level SIRs, and/or to determine reliability metrics for use in decoding the using data.

In some embodiments, resource elements may be divided into two or more discrete categories, based on any of the a priori information discussed above, and assigned interference scaling factors according to their categories. Using mathematical notation, a set of resource element positions k,l which are likely disturbed by neighboring cells may be denoted $K^{neighbor}$. A function $f_{k,l}(\hat{\sigma}_{k,l}^{2,RS})$ as defined in Equation (4) can be chosen, and the gain factors $c_{k,l}$ set according to:

$$c_{k,l} = \begin{cases} c^{data} & \text{if } k, l \notin K^{neighbor} \\ c^{neighbor} & \text{if } k, l \in K^{neighbor}. \end{cases} \quad (10)$$

The gains $c^{data}$ and $c^{neighbor}$ can be selected differently depending on whether the receiver determines the neighboring cells to have high or low utilization.

For instance, if all cells are deemed synchronized in time, and neighboring cells are mostly empty, then the set $K^{neighbor}$ of resource elements likely exposed to interference is determined (e.g., using the likely neighbor reference symbol positions 330 pictured in FIG. 3), and $c^{data}$ and $c^{neighbor}$ are selected such that $c^{neighbor}=1$ and $c^{data}<1$. The exact value of $c^{data}$ may be set as a function of a neighboring cell utilization factor, if one is known or can be estimated.

An exemplary method according to this general approach is shown in FIG. 6. At block 610, likely positions for reference symbols in a neighboring (interfering) signal are determined. In some cases, the mapping of reference symbols to subcarriers for the neighboring signal may be unknown, so that these likely positions might be narrowed only to individual OFDM symbols. In other situations, the cell ID of the neighboring symbols may be known, so that the neighbor cell reference symbol positions may be known more precisely. In either case, time offset information, if available, may be used to further refine the determination of which resource elements in the desired OFDM signal are likely receptors of interference. Although not shown in FIG. 6, similar procedures may be used with respect to control channel symbols and synchronization symbols from the neighboring cell. At block 620, a first scaling factor is assigned to each of the information-carrying resource elements of the desired OFDM signal that correspond to the likely positions for the neighboring reference symbols (and, optionally, synchronization and/or control channel symbols).

At block 630, a second scaling factor for other information-carrying resource elements is calculated, based on a utilization factor for the neighboring cell that is known, estimated, or assumed. In some embodiments, the second scaling factor may further be calculated based on the signal strength of the neighboring signal, if known. At block 640, the second scaling factor is assigned to other information-carrying resource elements of the desired signal. The scaling factors may be used as in the previously described method to estimate resource element-specific interference levels, for use in decoding the information symbols.

Those skilled in the art will appreciate that the method illustrated in FIG. 6 may be extended to include three or more categories of resource elements, where each category corresponds to a different likelihood of interference from a neighboring signal. The number of categories may depend, in some embodiments, upon the a priori information about the neighboring signal that is available. Thus, for example, if it is known that the neighboring cell is using three OFDM symbols in each subframe for control channel information, while the desired OFDM signal is using only two, a third category of symbols may include those resource elements in the received OFDM signal that correspond to probable positions for control channel symbols in the interfering signal.

The previously discussed methods have generally focused on approaches where probabilities of interference for individual resource elements are estimated based on known or assumed discrete elements of a priori information about the interfering signal or signals, such as the utilization factor. In other embodiments of the invention, resource element-specific interference scaling factors may instead be estimated based on comparing symbols reconstructed from successfully received data to the received symbol data. With this approach, instantaneous interference power is thus directly measured for information-carrying resource elements. With appropriate filtering and/or averaging, these instantaneous interference power estimates may be used to indirectly determine the likelihood of interference for future resource elements at the same or nearby position in the time-frequency grid of the received signal.

Figure 7:
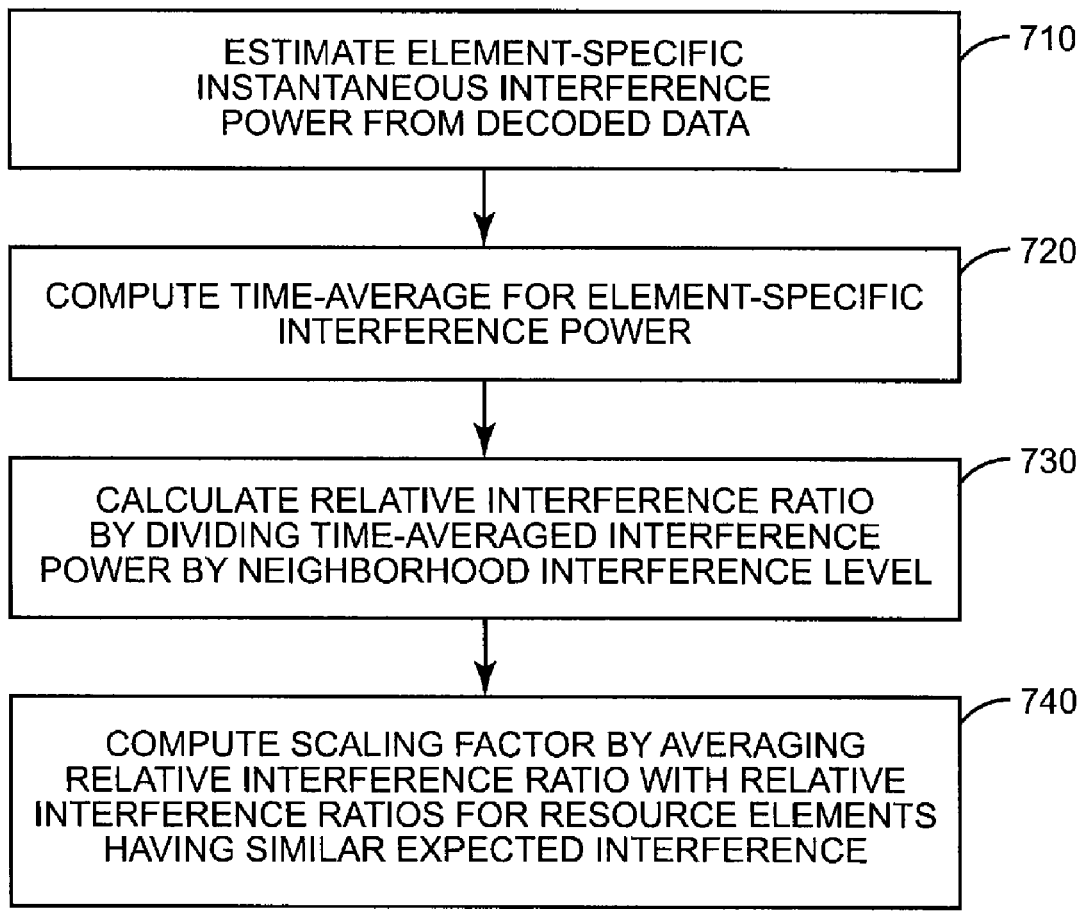

A process flow diagram illustrating such an approach is pictured in FIG. 7. At block 710, successfully received and decoded data is used to reconstruct the originally transmitted user symbol. The effects of the channel are applied to the reconstructed symbol, using the appropriate channel estimate, thus estimating the component of the received signal which corresponds to the symbol transmitted from the serving base station, $\hat{y}_{k,l}^{data}$. An instantaneous interference power estimate $\hat{\sigma}_{k,l}^{2,data}$ for each resource element may then be calculated as:

$$\hat{\sigma}_{k,l}^{2,data} = (y_{k,l} - \hat{y}_{k,l}^{data})^* (y_{k,l} - \hat{y}_{k,l}^{data}), \quad (11)$$

where $y_{k,l}$ is the actually received sampled symbol data corresponding to the reconstructed symbol $\hat{y}_{k,l}^{data}$. Of course, those skilled in the art will appreciate that these instantaneous power estimates are available only when the data for the corresponding resource element has been successfully decoded.

Through appropriate averaging, these instantaneous interference power estimates can be used to estimate the function $f_{k,l}(\hat{\sigma}_{k,l}^{2,RS})$ which relates reference symbol-based interference measurements to information-carrying resource element interference estimates. For instance, instantaneous interference power estimates may be averaged over a relatively long time, such as several OFDM frames, to cope with the bursty nature of interference. This averaging of measured resource element interference is shown at block 720, and yields a current resource element interference estimate $\overline{\sigma}_{k,l}^{2,data}$.

A relative interference ratio level may be calculated by dividing the current resource element interference estimate by a reference interference level determined from one or more reference symbols in the neighborhood of the resource element of interest, i.e., $\overline{\sigma}_{\kappa,\pi}^{2,data}/\hat{\sigma}_{\kappa,\pi}^{2,RS}$. Then, if $f_{k,l}(\hat{\sigma}_{k,l}^{2,RS})$ is defined as in Equation (4), the interference scaling factor for each resource element can be estimated, as shown at block 740. In some embodiments, the interference scaling factor may be calculated by averaging several relative interference ratio levels for a group of resource elements deemed to have similar exposure to interference:

$$c_{k,l} = \frac{1}{|K_{k,l}^c|} \sum_{\kappa,\lambda \in K_{k,l}^c} \frac{\overline{\sigma}_{\kappa,\lambda}^{2,data}}{\hat{\sigma}_{\kappa,\lambda}^{2,RS}}, \quad (12)$$

where the set $K_{k,l}^c$ is the set of positions for resource elements assumed to have similar properties. For example, this set may include neighboring resource elements in the same subframe, or resource elements at the same position in adjacent or nearby resource blocks.

Those skilled in the art will recognize that any of the methods described above, and variants thereof, may be implemented in a wireless receiver such as the OFDM receiver pictured in FIG. 2, which may be configured to comply with 3GPP standards for LTE systems and/or for use in one or more additional wireless communication systems. Accordingly, several embodiments of the present invention comprise a wireless receiver that includes one or more processing circuits configured to determine an interference scaling factor for each of a plurality of resource elements or groups of resource elements of the received OFDM signal, each interference scaling factor reflecting a probability that the corresponding resource element or group of resource elements includes interference from an interfering OFDM signal. These embodiments are further configured to measure a reference symbol interference level for each of a plurality of reference symbols in the received OFDM signal, and to calculate estimated interference levels for one or more of the resource elements as a function of the estimated reference symbol interference levels and the interference scaling factors.

Those skilled in the art will further appreciate that several of the various functional elements described herein, such as demodulation unit 220, decoder 230, channel estimation unit 240, and interference estimation unit 250, may be implemented with processing circuits comprising hardware, software, or any combination thereof. In some embodiments, these processing circuits may include at least one special- or general-purpose microprocessor circuit (to include DSP-type processors) configured with appropriate software and/or firmware to carry out one or more of the methods and techniques described herein. In such embodiments, the above-described functions of demodulation unit 220, decoder 230, channel estimation unit 240, or interference estimation unit 250, may be configured, for example, by provisioning a memory/storage device of the wireless receiver or mobile terminal with a computer program comprising program instructions corresponding to all or part of one or more of the described processing flows or variants thereof. Those skilled in the art will further appreciate that the various functions described herein and/or the various method elements claimed here may be split between two or more processing units, in some embodiments.

Broadly, the teachings of the present disclosure thus provide techniques and corresponding devices for estimating inter-cell interference levels for resource elements of a received OFDM signal. With the variations of the methods and apparatus described herein in mind, those skilled in the art will appreciate that the present invention is not limited by the foregoing discussion, nor is it limited by the accompanying drawings. Rather, the present invention is limited only by the following claims, and their legal equivalents.

What is claimed is:

1. A method in a wireless receiver for estimating inter-cell interference levels for resource elements of a received Orthogonal Frequency-Division Multiplexing (OFDM) signal, the method comprising:
   measuring a reference symbol interference level for each of a plurality of reference symbols in the received OFDM signal;
   mapping interference scaling factors to a plurality of resource elements of the received OFDM signal, each interference scaling factor reflecting a probability that the corresponding resource element is subject to interference from an interfering OFDM signal; and
   estimating an interference level for each of the plurality of resource elements as a function of the corresponding interference scaling factor and one or more of the measured reference symbol interference levels.

2. The method of claim 1, wherein estimating the interference level for each of the plurality of resource elements comprises:
   calculating a reference interference level for a region of proximately located resource elements based on measured reference symbol interference levels for two or more reference symbols within the region; and estimating the interference level for a resource element within the region by scaling the reference interference level with the interference scaling factor corresponding to that resource element.

3. The method of claim 1, wherein mapping interference scaling factors to a plurality of resource elements comprises assigning a first scaling factor value to resource elements having positions in the received OFDM signal that correspond to probable positions for reference symbols in the interfering OFDM signal and assigning one or more differing scaling factor values to remaining resource elements.

4. The method of claim 3, wherein mapping interference scaling factors to a plurality of resource elements further comprises assigning a second scaling factor value to resource elements having positions in the received OFDM signal that correspond to probable positions for control channel symbols in the interfering OFDM signal.

5. The method of claim 1, wherein mapping interference scaling factors to a plurality of resource elements comprises calculating one or more of the interference scaling factors as a function of a utilization factor corresponding to the interfering OFDM signal.

6. The method of claim 5, wherein the utilization factor is received by the wireless receiver from a serving base station.

7. The method of claim 1, wherein mapping interference scaling factors to a plurality of resource elements is based on one or more of:
a time offset between the received OFDM signal and the interfering OFDM signal;
a cell identifier corresponding to the interfering OFDM signal; and
an estimated signal strength for the interfering OFDM signal.

8. The method of claim 1, wherein mapping interference scaling factors to a plurality of resource elements comprises:
determining likely positions for reference symbols of the interfering OFDM signal based on the cell identifier corresponding to the interfering OFDM signal, the time offset between the received OFDM signal and the interfering OFDM signal, or both;
assigning a first scaling factor value to resource elements having positions in the received OFDM signal that correspond to said likely positions; and
assigning one or more differing scaling factor values to remaining resource elements.

9. The method of claim 1, wherein mapping interference scaling factors to a plurality of resource elements comprises:
determining likely positions for control channel symbols of the interfering OFDM signal based on the cell identifier corresponding to the interfering OFDM signal, the time offset between the received OFDM signal and the interfering OFDM signal, or both;
assigning a first scaling factor value to resource elements having positions in the received OFDM signal that correspond to said likely positions; and
assigning one or more differing scaling factor values to remaining resource elements.

10. The method of claim 1, wherein mapping interference scaling factors to a plurality of resource elements comprises, for at least a first resource element:
obtaining an instantaneous interference level estimate for the first resource element by comparing previously decoded data for the first resource element to corresponding samples of the received OFDM signal; and
calculating a first scaling factor for the first resource element based on the instantaneous interference level estimate.

11. The method of claim 10, wherein calculating a first scaling factor for the first resource element based on the instantaneous interference level estimate comprises averaging the instantaneous interference level estimate with at least one interference level estimate for the first resource element obtained from a prior OFDM subframe.

12. The method of claim 10, wherein calculating a first scaling factor for the first resource element based on the instantaneous interference level estimate comprises averaging the instantaneous interference level estimate with one or more additional interference level estimates corresponding to other resource elements deemed to have similar exposure to interference.

13. The method of claim 10, wherein calculating a first scaling factor for the first resource element based on the instantaneous interference level estimate comprises:
calculating a reference interference level for a region of proximately located resource elements containing the first resource element, based on measured reference symbol interference levels for two or more reference symbols within the region;
determining a first relative interference ratio by dividing the instantaneous interference level estimate by the reference interference level; and
calculating the first scaling factor by averaging the first relative interference ratio with one or more additional relative interference ratios for other resource elements deemed to have similar exposure to interference.

14. A wireless receiver for receiving an Orthogonal Frequency-Division Multiplexing (OFDM) signal, the wireless receiver comprising one or more processing circuits configured to:
measure a reference symbol interference level for each of a plurality of reference symbols in the received OFDM signal;
map interference scaling factors to a plurality of resource elements of the received OFDM signal, each interference scaling factor reflecting a probability that the corresponding resource element is subject to interference from an interfering OFDM signal; and
estimate an interference level for each of the plurality of resource elements as a function of the corresponding interference scaling factor and one or more of the measured reference symbol interference levels.

15. The wireless receiver of claim 14, wherein the one or more processing circuits are configured to estimate the interference level for each of the resource elements by:
calculating a reference interference level for a region of proximately located resource elements based on measured reference symbol interference levels for two or more reference symbols within the region; and
estimating the interference level for a resource element within the region by scaling the reference interference level with the interference scaling factor corresponding to that resource element.

16. The wireless receiver of claim 14, wherein the one or more processing circuits are configured to map interference scaling factors to the resource elements by assigning a first scaling factor value to resource elements having positions in the received OFDM signal that correspond to probable positions for reference symbols in the interfering OFDM signal and assigning one or more differing scaling factor values to remaining resource elements.

17. The wireless receiver of claim 16, wherein the one or more processing circuits are further configured to assign a second scaling factor value to resource elements having positions in the received OFDM signal that correspond to probable positions for control channel symbols in the interfering OFDM signal.

18. The wireless receiver of claim 14, wherein the one or more processing circuits are configured to map interference scaling factors to the resource elements by calculating one or more of the interference scaling factors as a function of a utilization factor corresponding to the interfering OFDM signal.

19. The wireless receiver of claim 18, wherein the wireless receiver is further configured to receive the utilization factor from a serving base station.

20. The wireless receiver of claim 14, wherein the one or more processing circuits are configured to map interference scaling factors to the resource elements based on one or more of:
   a time offset between the received OFDM signal and the interfering OFDM signal;
   a cell identifier corresponding to the interfering OFDM signal; and
   an estimated signal strength for the interfering OFDM signal.

21. The wireless receiver of claim 14, wherein the one or more processing circuits are configured to map interference scaling factors to the resource elements by:
   determining likely positions for reference symbols of the interfering OFDM signal based on the cell identifier corresponding to the interfering OFDM signal, the time offset between the received OFDM signal and the interfering OFDM signal, or both;
   assigning a first scaling factor value to resource elements having positions in the received OFDM signal that correspond to said likely positions; and
   assigning one or more differing scaling factor values to remaining resource elements.

22. The wireless receiver of claim 14, wherein the one or more processing circuits are configured to map interference scaling factors to the resource elements by:
   determining likely positions for control channel symbols of the interfering OFDM signal based on the cell identifier corresponding to the interfering OFDM signal, the time offset between the received OFDM signal and the interfering OFDM signal, or both;
   assigning a first scaling factor value to resource elements having positions in the received OFDM signal that correspond to said likely positions; and
assigning one or more differing scaling factor values to remaining resource elements.

23. The wireless receiver of claim 14, wherein the one or more processing circuits are configured to map interference scaling factors to the resource elements by, for at least a first resource element:
   obtaining a instantaneous interference level estimate for the first resource element by comparing previously decoded data for the first resource element to corresponding samples of the received OFDM signal; and
   calculating a first scaling factor for the first resource element based on the instantaneous interference level estimate.

24. The wireless receiver of claim 23, wherein the one or more processing circuits are configured to calculate the first scaling factor for the first resource element based on the instantaneous interference level estimate by averaging the instantaneous interference level estimate with at least one interference level estimate for the first resource element obtained from a prior OFDM subframe.

25. The wireless receiver of claim 23, wherein the one or more processing circuits are configured to calculate the first scaling factor for the first resource element based on the instantaneous interference level estimate by averaging the instantaneous interference level estimate with one or more additional interference level estimates corresponding to other resource elements deemed to have similar exposure to interference.

26. The wireless receiver of claim 23, wherein the one or more processing circuits are configured to calculate the first scaling factor for the first resource element based on the instantaneous interference level estimate by:
   calculating a reference interference level for a region of proximately located resource elements containing the first resource element, based on measured reference symbol interference levels for two or more reference symbols within the region;
   determining a first relative interference ratio by dividing the instantaneous interference level estimate by the reference interference level; and
   calculating the first scaling factor by averaging the first relative interference ratio with one or more additional relative interference levels corresponding to other resource elements deemed to have similar exposure to interference.

27. A mobile terminal for receiving an Orthogonal Frequency-Division Multiplexing (OFDM) signal, the mobile terminal comprising one or more processing circuits configured to:
   measure a reference symbol interference level for each of a plurality of reference symbols in the received OFDM signal;
   map interference scaling factors to a plurality of resource elements of the received OFDM signal, each interference scaling factor reflecting a probability that the corresponding resource element is subject to interference from an interfering OFDM signal; and
   estimate an interference level for each of the plurality of resource elements as a function of the corresponding interference scaling factor and one or more of the measured reference symbol interference levels.

* * * * *

UNITED STATES PATENT AND TRADEMARK OFFICE
CERTIFICATE OF CORRECTION

PATENT NO.        : 8,130,849 B2
APPLICATION NO.   : 12/211470
DATED             : March 6, 2012
INVENTOR(S)       : Lincoln et al.

It is certified that error appears in the above-identified patent and that said Letters Patent is hereby corrected as shown below:

In Column 1, Line 10, delete "Orthogonal-Frequency" and insert -- Orthogonal Frequency --, therefor.

In Column 4, Line 17, delete "210" and insert -- 120 --, therefor.

In Column 13, Line 38, delete "$\overline{\sigma}_{\kappa,\pi}^{2,data} / \hat{\sigma}_{\kappa,\pi}^{2,RS}.$" and insert -- $\overline{\sigma}_{\kappa,\lambda}^{2,data} / \hat{\sigma}_{\kappa,\lambda}^{2,RS}.$ --, therefor.

Signed and Sealed this
Fourth Day of September, 2012

David J. Kappos
*Director of the United States Patent and Trademark Office*